(12) United States Patent
O'Brien et al.

(10) Patent No.: US 12,487,597 B2
(45) Date of Patent: Dec. 2, 2025

(54) SYSTEM AND METHOD FOR AUTONOMOUS DECISION MAKING, CORRECTIVE ACTION, AND NAVIGATION IN A DYNAMICALLY CHANGING WORLD

(71) Applicant: Walmart Apollo, LLC, Bentonville, AR (US)

(72) Inventors: John J. O'Brien, Farmington, AR (US); Donald R. High, Noel, MO (US); Brian Mchale, Oldham (GB); David Winkle, Bentonville, AR (US)

(73) Assignee: Walmart Apollo, LLc, Bentonville, AR (US)

( * ) Notice: Subject to any disclaimer, the term of this patent is extended or adjusted under 35 U.S.C. 154(b) by 196 days.

(21) Appl. No.: 18/181,350

(22) Filed: Mar. 9, 2023

(65) Prior Publication Data
US 2023/0213940 A1    Jul. 6, 2023

Related U.S. Application Data

(63) Continuation of application No. 16/259,463, filed on Jan. 28, 2019, now Pat. No. 11,630,455.
(Continued)

(51) Int. Cl.
*G05D 1/00*    (2024.01)
*B64C 23/00*    (2006.01)
(Continued)

(52) U.S. Cl.
CPC ........... *G05D 1/0088* (2013.01); *B64C 23/00* (2013.01); *G05D 1/0202* (2013.01); *G05D 1/101* (2013.01);
(Continued)

(58) Field of Classification Search
CPC .... G05D 1/0088; G05D 1/0202; G05D 1/101; B64C 23/00; G08G 5/0008;
(Continued)

(56) References Cited

U.S. PATENT DOCUMENTS 8,028,216 B1 *    9/2011    Yeo ................... H03M 13/6362
                                                                   714/755
9,201,421 B1 *    12/2015    Fairfield .............. G05D 1/0088
(Continued)

FOREIGN PATENT DOCUMENTS

| CN | 106597510 A | 4/2017 |
| CN | 106840093 A | 6/2017 |
| WO | 2019/057302 A1 | 3/2019 |

OTHER PUBLICATIONS

International Search Report and Written Opinion dated Apr. 26, 2019, issued in corresponding PCT Application No. PCT/US2019/015422.

*Primary Examiner* — Sze-Hon Kong
(74) *Attorney, Agent, or Firm* — Morgan, Lewis & Bockius LLP; Manita Rawat (57) ABSTRACT

An autonomous vehicle system includes a body and a plurality of sensors coupled to the body and configured to generate a plurality of sensor measurements corresponding to the plurality of sensors. The system also includes a control unit configured to: receive inputs from a plurality of sources wherein the plurality sources comprise the plurality of sensors, the inputs comprise the plurality of sensor measurements; determine a confidence level of each input based on other inputs; prioritize, based on the confidence level associated with each input, the inputs; generate, based on the prioritization of the inputs and the confidence level, a combined input with a combined confidence level; and
(Continued)

determine, based on the combined input and the combined confidence level, a mission task to be performed.

20 Claims, 6 Drawing Sheets

Related U.S. Application Data (60) Provisional application No. 62/624,728, filed on Jan. 31, 2018.

(51) Int. Cl.
| | | |
|---|---|---|
| *G08G 5/21* | (2025.01) | |
| *G08G 5/25* | (2025.01) | |
| *G08G 5/26* | (2025.01) | |
| *G08G 5/53* | (2025.01) | |
| *G08G 5/55* | (2025.01) | |
| *G08G 5/57* | (2025.01) | |
| *G08G 5/72* | (2025.01) | |
| *G08G 5/76* | (2025.01) | |
| *B64U 101/64* | (2023.01) | |
| *G06N 20/00* | (2019.01) | |

(52) U.S. Cl.
CPC ............ *G08G 5/21* (2025.01); *G08G 5/25* (2025.01); *G08G 5/26* (2025.01); *G08G 5/53* (2025.01); *G08G 5/55* (2025.01); *G08G 5/57* (2025.01); *G08G 5/723* (2025.01); *G08G 5/76* (2025.01); *B64U 2101/64* (2023.01); *B64U 2201/10* (2023.01); *G06N 20/00* (2019.01)

(58) Field of Classification Search
CPC .. G08G 5/0013; G08G 5/0021; G08G 5/0052; G08G 5/0069; G08G 5/0078; G08G 5/0091; B64U 2101/64; B64U 2201/10; B64U 2201/104; G06N 20/00; G06N 5/04; B64D 45/00
See application file for complete search history.

(56) References Cited

U.S. PATENT DOCUMENTS

| | | | |
|---|---|---|---|
| 9,218,232 B2 | 12/2015 | Khalastchi et al. | |
| 9,224,053 B1 | 12/2015 | Ferguson et al. | |
| 9,540,121 B2 | 1/2017 | Byers et al. | |
| 9,720,415 B2 | 8/2017 | Levinson et al. | |
| 9,728,014 B2 | 8/2017 | Khalaschi et al. | |
| 9,805,273 B1 | 10/2017 | Seeber et al. | |
| 10,048,686 B2* | 8/2018 | Brekke | G01C 21/20 |
| 10,268,191 B1* | 4/2019 | Lockwood | G05D 1/0027 |
| 10,921,167 B1 | 2/2021 | Sahar et al. | |
| 2003/0186663 A1* | 10/2003 | Chen | G06F 18/256 |
| | | | 455/226.3 |
| 2010/0063672 A1* | 3/2010 | Anderson | G05D 1/0077 |
| | | | 701/29.2 |
| 2011/0246551 A1 | 10/2011 | Giancaspro et al. | |
| 2014/0330456 A1 | 11/2014 | Lopez Morales et al. | |
| 2015/0112570 A1* | 4/2015 | Schmudderich | G06V 20/58 |
| | | | 701/1 |
| 2015/0225081 A1 | 8/2015 | Stabler et al. | |
| 2015/0331422 A1 | 11/2015 | Hartung et al. | |
| 2016/0101855 A1 | 4/2016 | Stefani | |
| 2016/0117932 A1 | 4/2016 | Park et al. | |
| 2016/0236638 A1 | 8/2016 | Lavie et al. | |
| 2016/0260328 A1 | 9/2016 | Mishra et al. | |
| 2016/0274578 A1 | 9/2016 | Arwine | |
| 2016/0275801 A1 | 9/2016 | Kopardekar | |
| 2016/0294829 A1* | 10/2016 | Angus | H04L 63/18 |
| 2016/0299233 A1 | 10/2016 | Levien et al. | |
| 2017/0045892 A1 | 2/2017 | Wang et al. | |
| 2017/0090480 A1* | 3/2017 | Ho | B60W 30/00 |
| 2017/0131716 A1 | 5/2017 | Brekke et al. | |
| 2017/0166218 A1* | 6/2017 | Hoare | B60W 30/06 |
| 2017/0269611 A1 | 9/2017 | Rangarajan | |
| 2017/0285092 A1 | 10/2017 | Moore | |
| 2017/0364095 A1 | 12/2017 | Wang et al. | |
| 2018/0001890 A1 | 1/2018 | Ratcliffe | |
| 2018/0012498 A1 | 1/2018 | Zhu et al. | |
| 2018/0017973 A1 | 1/2018 | Teague | |
| 2018/0029092 A1* | 2/2018 | Burrage | G16C 20/80 |
| 2018/0032042 A1* | 2/2018 | Turpin | H04N 13/296 |
| 2018/0072419 A1 | 3/2018 | Burgess et al. | |
| 2018/0106885 A1* | 4/2018 | Blayvas | G01S 13/723 |
| 2018/0127001 A1 | 5/2018 | Ricci | |
| 2018/0239991 A1* | 8/2018 | Weller | G06F 16/907 |
| 2018/0270244 A1* | 9/2018 | Kumar | H04L 9/3239 |
| 2018/0274927 A1* | 9/2018 | Epperlein | G01C 21/20 |
| 2018/0348358 A1* | 12/2018 | Anderson | G01S 13/82 |
| 2018/0348374 A1* | 12/2018 | Laddha | G01S 17/931 |
| 2019/0041856 A1 | 2/2019 | Dippelein et al. | |
| 2019/0047581 A1* | 2/2019 | Bai | G06F 9/5027 |
| 2019/0056726 A1 | 2/2019 | Weldemariam et al. | |
| 2019/0073908 A1* | 3/2019 | Neubecker | G08G 1/09675 |
| 2019/0205887 A1 | 7/2019 | Kimmel | |
| 2019/0206156 A1* | 7/2019 | Ponda | B64D 47/00 |
| 2019/0214019 A1* | 7/2019 | White | H04W 4/33 |
| 2019/0265705 A1* | 8/2019 | Zhang | G05D 1/227 |
| 2019/0361460 A1* | 11/2019 | Medeiros | G05D 1/00 |
| 2020/0109954 A1* | 4/2020 | Li | G01C 21/3848 |
| 2020/0236602 A1 | 7/2020 | Mahkonen et al. | |
| 2020/0272110 A1 | 8/2020 | Pan et al. | |
| 2021/0286651 A1* | 9/2021 | Ho | G06F 3/0647 |
| 2022/0105634 A1* | 4/2022 | Oboril | G09B 19/24 |
| 2023/0176575 A1* | 6/2023 | Letwin | B60T 8/17557 |
| | | | 701/23 |

* cited by examiner

SYSTEM AND METHOD FOR AUTONOMOUS DECISION MAKING, CORRECTIVE ACTION, AND NAVIGATION IN A DYNAMICALLY CHANGING WORLD

CROSS REFERENCE TO RELATED APPLICATIONS

The present application is a continuation of U.S. patent application Ser. No. 16/259,463, filed Jan. 28, 2019, and entitled "SYSTEM AND METHOD FOR AUTONOMOUS DECISION MAKING, CORRECTIVE ACTION, AND NAVIGATION IN A DYNAMICALLY CHANGING WORLD," which claims priority to U.S. Provisional Patent Application No. 62/624,728, filed on Jan. 31, 2018, entitled "SYSTEM AND METHOD FOR AUTONOMOUS DECISION MAKING, CORRECTIVE ACTION, AND NAVIGATION IN A DYNAMICALLY CHANGING WORLD," each of which is hereby incorporated by reference in its entirety.

TECHNICAL FIELD

The present disclosure relates to autonomous vehicles. More specifically, the present disclosure relates to a system and method for autonomous decision making, corrective action, and navigation.

BACKGROUND

Since situations and environments change, autonomous flight for unmanned aerial vehicles (UAVs) is a difficult achievement. Software or artificial intelligence (AI) may not be relied upon alone. National Aeronautics and Space Administration (NASA) has proposed to use their Expandable Variable Autonomy Architecture (EVAA) system for in-flight and highspeed collision avoidance. NASA's EVAA attempts to solve high-speed collisions; which is accomplished by capturing optical images from the UAV's camera and then referencing those images to a database of known values. However, a corrective action has not been defined. There are still many variables that need to be considered for complete autonomous flight. For instance, the following are examples that have not been answered: What if a UAV is landing and a sensor notices an unsafe event? What if a UAV is flying and notices an aircraft in their path? What if a UAV receives weather information that is beyond the aircraft's capabilities? What if a UAV loses communications with an unmanned traffic management (UTM), an air traffic controller (ATC), command and Control (C2)? What if a sensor onboard the UAV fails? What if data is received by the UAV that conflicts with its' sensors findings? What if a conflict arises between two or more sensors on a UAV? What actions does the UAV take when a corrective action is required? How does a UAV prioritize its many sensors to make the best decision? And/or how does a UAV handle unsecured or untrusted inputs?

What is provided herein are systems and methods for autonomous decision making, corrective action, and navigation, which may address aspects of the above questions.

SUMMARY

Disclosed herein are autonomous vehicle systems. The system includes a body and a plurality of sensors coupled to the body and configured to generate a plurality of sensor measurements corresponding to the plurality of sensors. Each of the plurality of sensors is specified with a sensor threshold. The system also includes a control unit configured to: receive inputs from a plurality of sources wherein the plurality sources comprise the plurality of sensors, the inputs comprise the plurality of sensor measurements; determine a confidence level of each input based on other inputs of the received inputs; prioritize, based on the confidence level associated with each input, the inputs; generate, based on the prioritization of the inputs and the confidence level, a combined input with a combined confidence level; and determine, based on the combined input and the combined confidence level, a mission task to be performed; determine if the confidence level is high enough to that mission; and take another action if the confidence level is not high enough. The system further includes a database configured to: store the inputs and the corresponding confidence level; store the combined input and the combined confidence level; and store the action to be performed.

Disclosed herein is also a method. The method include: receiving inputs from a plurality of sources wherein the plurality sources comprise a plurality of sensors, the inputs comprise a plurality of sensor measurements corresponding to the plurality sensors; determining a confidence level of each input based on other inputs; storing the inputs and the corresponding confidence levels; prioritizing, based on the confidence level associated with each input, the inputs; generating, based on the prioritization of the inputs and the confidence levels, a combined input with a combined confidence level; storing the combined input and the combined confidence level; determining, based on the combined input and the combined confidence level, a mission task to be performed; and storing the mission task to be performed. The plurality of sensors are configured to generate the plurality of sensor measurements corresponding to the plurality of sensors, and each of the plurality of sensors is specified with a sensor threshold.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF THE DRAWINGS

Embodiments of this disclosure are illustrated by way of an example and not limited in the figures of the accompanying drawings, in which like references indicate similar elements and in which.

DETAILED DESCRIPTION

Various configurations and embodiments of the disclosure are described in detail below. While specific implementations are described, it should be understood that this is done for illustration purposes only. Other components and configurations may be used without parting from the spirit and scope of the disclosure.

In this disclosure, a comprehensive system is provided to addresses the dynamically ever-changing situations presented from real world environments to a UAV's artificial intelligence/control unit in a completely autonomous system's cycle. Further, necessary corrective actions for the different dynamic situations may be defined.

In some embodiments, a system of confidence levels may be used with trusted certificates to validate inputs and make assumptions on the priorities of these inputs. A new input received by the UAV's AI/control unit may be processed with its confidence level about the context of the input provided. These confidence levels may be expressed in a binary code that may include a matrix of binary code entries to further supplement the confidence level. Confidence levels may vary for each input depending on the context and its' correlation to the inputs confidence level for that input. Thus, an optical sensor may have a high confidence level when being used during clear visibility but may have a lesser confidence level when being used in fog.

Example inputs may include, but not limited to: a flight controller, a flight system, a laser altimeter, a global positioning system (GPS), a differential GPS, a light detection and ranging (LIDAR) system, a radio detecting and ranging (RADAR) system, a transponder, an optic sensor, an automatic dependent surveillance broadcast (ADSB) sensor, a real time kinematic (RTK) satellite navigation, UTM, an ATC, C2, geofence, a weather monitor, aircraft capabilities and limitations, accelerometer, magnetometer, gyroscope, faulty equipment, waypoints and routes, delivery destinations, user inputs, Internet connectivity, satellite connectivity, invalidated communications, and communication with other autonomous vehicles.

The aircraft capabilities and limitations may be predefined in a logic (e.g., control unit) onboard the UAV. Faulty equipment may be diagnosed by the UAV or invalidated by a confidence level. Invalidated communications may include, for example, invalidated communication with a C2, UTM, ATC, or other entity.

Confidence levels may be assigned to a sensor based on the sensors optimal use in their optimal situation. When the use or situation deters from the optimal situation, the readings of the sensor may be variable from the original optimal value. This may allow a conglomerate of sensors to provide insight into a given situation from their different vantage points while still prioritizing the decision-making cycle.

In some embodiments, a system of trusted certificates may be used for additional decision making beyond the confidence level system. Trusted certificates may accompany a validated input or may be defined and stored in the UAV's artificial intelligence/control unit.

Sources of trusted certificates may include flight controller, flight system, laser altimeter, GPS, Differential GPS, RTK, optic sensors, LIDAR, RADAR, ADSB Sensors and transponders, UTM, ATC, C2, geofence, WX Services (weather monitor), Radar, aircraft capabilities and limitations. If the condition of a source is in jeopardy, which may be determined by a sources confidence level, trusted certificate, or a diagnostic performed by the UAV, then the trusted certificate may be invalidated.

Sources of untrusted certificates may include: faulty equipment that has been diagnosed by the UAV or invalidated by a confidence level; waypoints & routes; delivery destinations; user inputs; Internet connectivity; satellite connectivity; invalidated communications (for example, invalidated communication with a C2, UTM, ATC, or other entity.)

In some embodiments, corrective actions may be accompanied with inputs received. Triggers and thresholds for corrective actions may also be provided. For example, if an event occurs that compromises the system, that is, conflicts with a confidence level or trusted source's finding, then a trigger may be produced by the confidence level or trusted source's findings, which may require a corrective action.

As an example, if a UAV's mission instructs it to drop a package at a customer's location, but the laser altimeters on the UAV may provide inputs that indicate people are in an unsafe vicinity of the package drop. Then the laser altimeter may provide the input to the UAV with a confidence level of (−1). The AI/control unit onboard the UAV may receive this input and validate the source, checking for a trusted certificate and any supplemental information that accompanies the binary confidence level entry of (−1). Also, the system may request or receive from other sources information to validate the input from the laser altimeter and provide further redundancy. For example, inputs from other sensors that can detect people, such as thermal imaging or infrared sensors, or optical sensors, may be examined to determine if these sensors also detect people in the unsafe vicinity. Once this input from the laser altimeter has been qualified, the UAV may reference a series of corrective actions from its' onboard logic or artificial intelligence. Also, corrective actions may accompany the confidence level input sent from the laser altimeter and received by the UAV. The UAV may take the corrective actions. Additionally, when the corrective action occurs, the control unit may request from other sources, such as optics and flight maneuvers, the confidence levels they find on the corrective action. For example, is this the best corrective action to take?

Examples of corrective actions may include, but not limited to: resolution with a central authority, such as a Host, Network, C2, UTM, Mission Planner, etc.; forced landing; forced landing to a preferred or known safe location; emergency status beaconing; a flight maneuver, such as stop, turn, yaw, bank, pitch, roll, hover, accelerate, decelerate, etc. Corrective actions may be driven by inputs that require corrective actions, which are determined by trusted certificates, confidence levels, etc. Logic decision making may be driven by confidence levels, trusted certificates, and corrective actions. For example, when people are detected in an unsafe vicinity of the UAV landing at a drop point, the corrective action may be to hover for a predetermined time and then check the vicinity again. This process may repeat until a safe landing is possible or for a predetermined time, after which the UAV proceeds to another destination.

In some embodiments, the autonomous system may be able to make a decision with incomplete information. The system may also choose between two options of equal validity (for example, the problem where multiple drones work together and elect a drone leader). The system may also answer questions that were not expected. The AI aspect of the system may learn from situations that the system has experienced similar such situations in the past. For example, the system may look at the history of data and decisions made in the past, and use that to improve outcomes going forward.

In some embodiments, the autonomous system may use a whole array of sensors, thresholds for each sensor, a set of priorities of sensor measurements, a quantity of trust of each sensor/measurement, and a trust value for the actions taken by the system as a result of the sensor measurements. Trust may also be a factor of conditions (e.g., fog may affect the trust of optical sensors/cameras).

Based upon the sensors and measurements, the system may direct an autonomous vehicle to: forced landing; change communications method; disable sensor system; change route to avoid area, etc.

The system may group and prioritize sensors and measurements, and lump these together to determine actions. For example, a group of sensors for measuring altitude may include: laser altimeter, Lidar, GPS, Differential GPS, etc. A group of sensors for determining geographic position may include: GPS, Differential GPS, ADSB in, Radar, etc.

Each of the altitude sensors may have a range of measurement where the sensor is accurate, and have an accuracy associated with these measurements. The system may take this into account when reviewing grouped measurements and determining what value or combined value to use.

In some embodiments, the AI/control unit may operate using sensors from r other sources, such as ground locations or retail stores. Different levels of AI may be provided. For example, the level of AI may be a local radar ATC to AI; lasers from landing pad beacons to AI; or filtered data from the system which may be germane to the UAV to AI.

In a case of an autonomous guided vehicle (AGV) or autonomous unmanned vehicle (AUV), a police officer or other regulatory individual, may need to stop the AGV or AUV to inspect the cargo hold. The autonomous system may need to look for other vehicles and pedestrians, and find a safe place to stop the AGV or AUV. Also, the system may review the authority's credentials (e.g., ID of the police officer) and approve the AGV or AUV to open the cargo hold for inspection The system may have a confidence level sub-system for recognizing law enforcement authorities (badge, car markings, verification through headquarters, radio frequency used, etc). The AGV or AUV may stop and shut down while awaiting verification.

In some embodiments, the system could use blockchain to store sensors, measurements, drone ID, actions and results. Based upon the set of measurements, a UAV may choose an action/mission task and ask the system for permission. The system could weigh the inputs and determine an outcome. The data could be stored in a blockchain ledger or a hybrid database structure.

In some cases, sensor measurements may not be consistent. For example, various sensors may be affected if the vehicle is near a large iron deposit. Equipment failure may cause invalid measurements. Vandals may have altered or moved a speed limit sign. The system may read the altered sign and then compare the altered sign speed limit with the same one in the history file. The discrepancy of sign placement or sign speed limit change may cause the system to be suspicious. The system may determine if the change may affect the mission, and may choose the lower of the two speed limits in order not to jeopardize the mission with a potentially dangerous speed. Going forward, other UAVs may choose to avoid the road with the unsure speed limit.

The system may compare information from the history with the current information, and decide if the change is reasonable (e.g., speed limit was 35 mph for years and today it is marked 75 mph). Also, if it has been a week since this road was traveled, the historical data may bear a less confidence today (the age of the data is germane). If the GPS and DGPS measurements do not agree, the system may determine if the difference may have an impact on the mission. If the mission may be unaffected, the system may proceed and use a weighted average of the two readings from the GPS and DGPS. Mission impact threshold may be determined, e.g., how much does it affect the mission?

When input data received by a UAV conflict, for example, having two different devices reporting two different data for the same situation, the logic onboard the UAV may be able to determine which input is the most trusted per se in this given situation. And therefore, the data from this source is what should be relied upon.

For example, in an optical sensor that is looking to see what its periphery is, if the condition outside is foggy or night time, inputs from other sensors may be prioritized over the findings of the optical sensor. The logic may not rely on input data from the optical sensor to make a decision.

In some embodiments, the autonomous system may make a decision with incomplete or inconsistent information. In other words, it needs to be able to make a decision when it does not have all of the information it needs or when some of the information may be impacted in some way.

In some embodiments, the control unit may preset or dynamically determine confidence levels for sensor inputs. A sensor may be determined to be more applicable than another sensor, depending on a situation. For example, if a UAV is flying, a laser altimeter may be assigned a lower confidence level while GPS may be assigned a higher confidence level. If a UAV is landing, a laser altimeter may be assigned a higher confidence level while GPS may be assigned a lower confidence level. That is, the laser altimeter is prioritized over the GPS during landing.

In determining change to confidence level of a sensor, the autonomous system may assembly the other sensor information. Information that are available from other sources may be reviewed collectively if they form an aggregate, to build a confidence level on the sensor. For example, when locating a vehicle using a primary sensor, if the primary sensor does not work well, the other information (e.g., location information) from other sensors may be used to locate the vehicle. The other sensors may include Wi-Fi, LED, DGPS that can refine that set of information and get to the same conclusion as the one obtained by using the primary sensor.

In addition to the sensor inputs, some logical information/input may also be received by the UAV to make a decision. The logical information may include image pre-processing, authentication mechanism authorization, and information from peer UAVs. The logical information may also include diagnostics or maintenance information of sensors, operational status, air traffic control conditions, and environmental factors. For example, if a sensor has not undergone maintenance for a long time or is damaged, or broken, then less confidence may be put in that sensor.

In some embodiments, the system may include an extensible algorithm with a configurable list of priority decisions. The primary inputs that are needed for a respective decision may be provided. In the absence of one or more of the primary inputs, that decision may be made based on assembled confidence levels based on secondary inputs. The secondary inputs and confidence levels may meet a certain threshold to make the decision. In cases where a list of priority decisions are not specified, the algorithm may fall back to a default set of choices. That allows for configuring different situations to prioritize the decision-making process, in the absence of a full set of information.

For example, a list of primary inputs and secondary inputs may be provided, and a choice needs to be made when one or more of the primary inputs is missing, by the assembly of secondary inputs based confidence levels. As an example, when a drone is navigating a doorway, a camera may be the primary input. If the camera is not working, the visual analysis may not be able to be performed. In such situations, the drone may fall back to secondary, alternate inputs. Examples of alternate inputs could be inputs from peers using sensors, e.g., communicating with or from another nearby drone.

Figure 1:
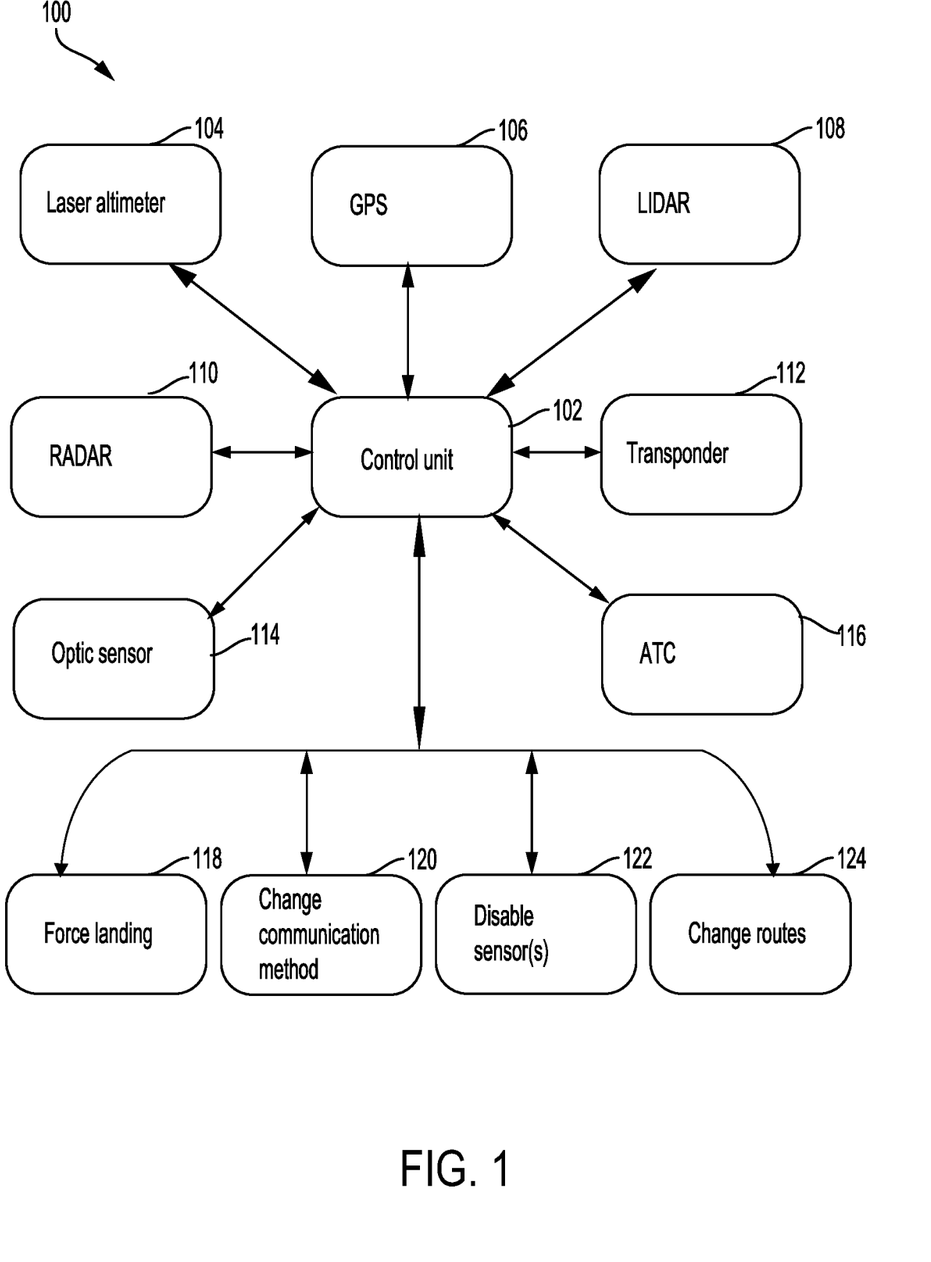
FIG. 1 is a block diagram depicting an example autonomous vehicle system in which example embodiments of the present disclosure may be implemented.

FIG. 1 is a block diagram depicting an example autonomous vehicle system 100 in which example embodiments of the present disclosure may be implemented. The vehicle system 100 may include a control unit 102 coupled to a vehicle body, and a plurality of sensors coupled to the vehicle body. The sensors may be configured to generate a plurality of sensor measurements corresponding to the plurality of sensors, wherein each of the plurality of sensors may be specified with a sensor threshold.

The control unit 102 may be configured to: receive inputs from a plurality of sources wherein the plurality sources comprise the plurality of sensors. The inputs may comprise the plurality of sensor measurements. The control unit 102 may determine a confidence level of each input based on other inputs; prioritize, based on the confidence level associated with each input, the inputs; generate, based on the prioritization of the inputs and the confidence level, a combined input with a combined confidence level; and determine, based on the combined input and the combined confidence level, a mission task to be performed. The system 100 may further comprise a database configured to: store the inputs and the corresponding confidence levels; store the combined input and the combined confidence level; and store the action to be performed. The autonomous vehicle may be an automatic guided vehicle or an unmanned aerial vehicle. The sensor threshold is determined by a measurement range of the corresponding sensor. The control unit 102 may be further configured to group, based on a measurement type, the inputs.

The sensors may comprise a laser altimeter 104, a GPS 106, a LIDAR system 108, a RADAR system 110, a transponder 112, an optic sensor 114, and/or an air traffic controller (ATC) 116.

In some embodiments, the sensors may also comprise an ADSB sensor, a flight controller, a flight system, a RTK satellite navigation, UTM, command and C2, geofence, a weather monitor, aircraft capabilities and limitations, accelerometer, magnetometer, gyroscope, faulty equipment, waypoints and routes, delivery destinations, user inputs, Internet connectivity, satellite connectivity, invalidated communications, and communication with other autonomous vehicles.

In some embodiments, not all sensors are on a vehicle (e.g., drone, AGV). There may also be sensors that are on the ground as external sensors for providing information to the vehicle. For example, a ground controller of a drone may have sensor equipment that provides information to the drone and instruct the drone what to do. The drone may decide whether or not to accept that information. As described above, inputs do not need to be direct sensory inputs, and can be operational information, contextual information, and environmental factors.

The sensors may acquire a large amount of data. That data can enable later vehicles to know what sensors to turn on and turn off, and what sensors to ignore and not ignore. The information may be used to help establish the confidence level of inputs.

In some embodiments, the inputs may further comprise historical data of the plurality of sources. The historical data may be stored in the database.

The mission task to be performed may comprise a forced landing of the autonomous vehicle 118, changing communication method 120, disabling one or more of the plurality of sensors 122, changing a route of the autonomous vehicle 124, beaconing an emergency status, and/or performing a desired flight maneuver of the autonomous vehicle.

In some embodiments, one or more of the inputs may be associated with a corresponding trusted certificate. The corresponding trusted certificate may be defined and stored in the control unit 102.

In some embodiments, the confidence level may comprise a binary code. The binary code may include a matrix of binary code entries. The confidence level may be generated based on a risk level, a precision level, and/or an operational condition. The mission task to be performed may be accompanied with the confidence level.

Figure 2:
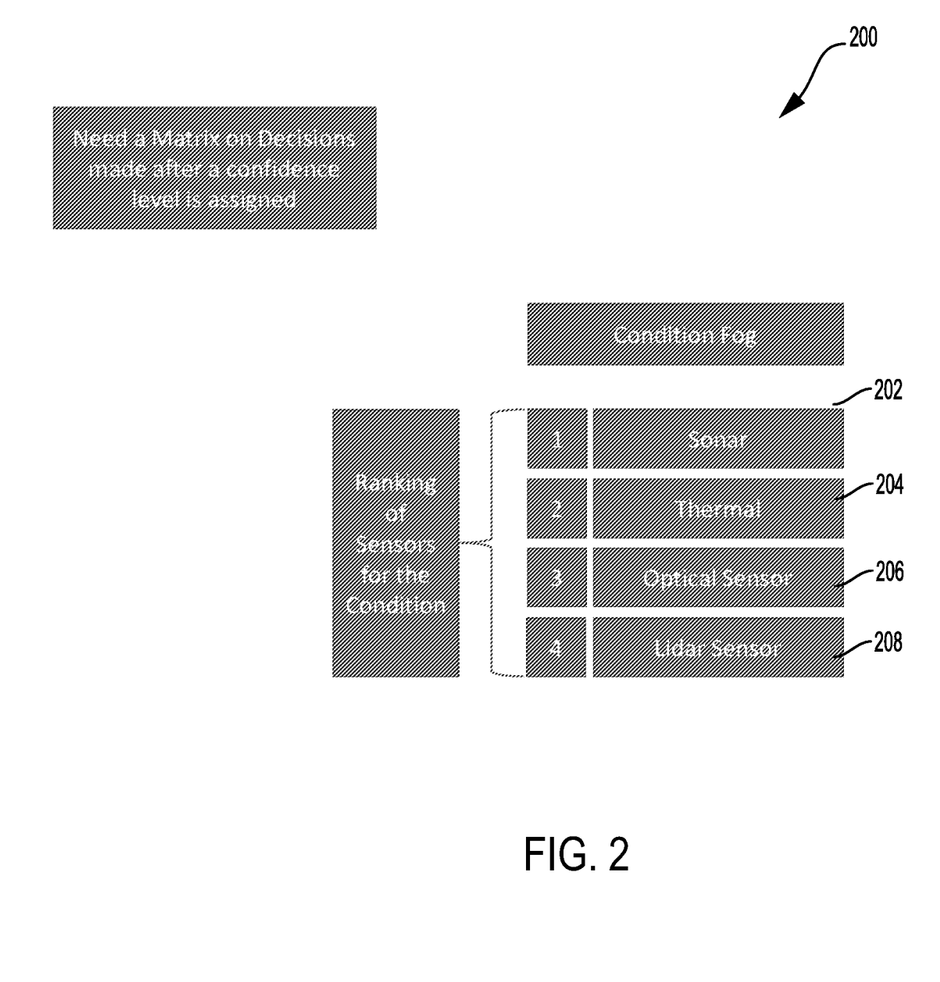
FIG. 2 is a block diagram depicting an embodiment of confidence levels under a condition in accordance with the present disclosure.

FIG. 2 is a block diagram depicting an embodiment of confidence levels under a condition in accordance with the present disclosure. As shown in the matrix 200, a fog condition is applied when assigning a confidence level to a sensor input. Based on the fog condition, a ranking of sensory inputs is provided. For example, sonar input 202 is ranked highest having a highest confidence level, thermal input 204 is ranked second highest having a second highest confidence level, and so on with the lidar sensor input 208 being ranked lowest. Different confidence levels may be assigned to the different sources depending on the circumstances.

Figure 3:
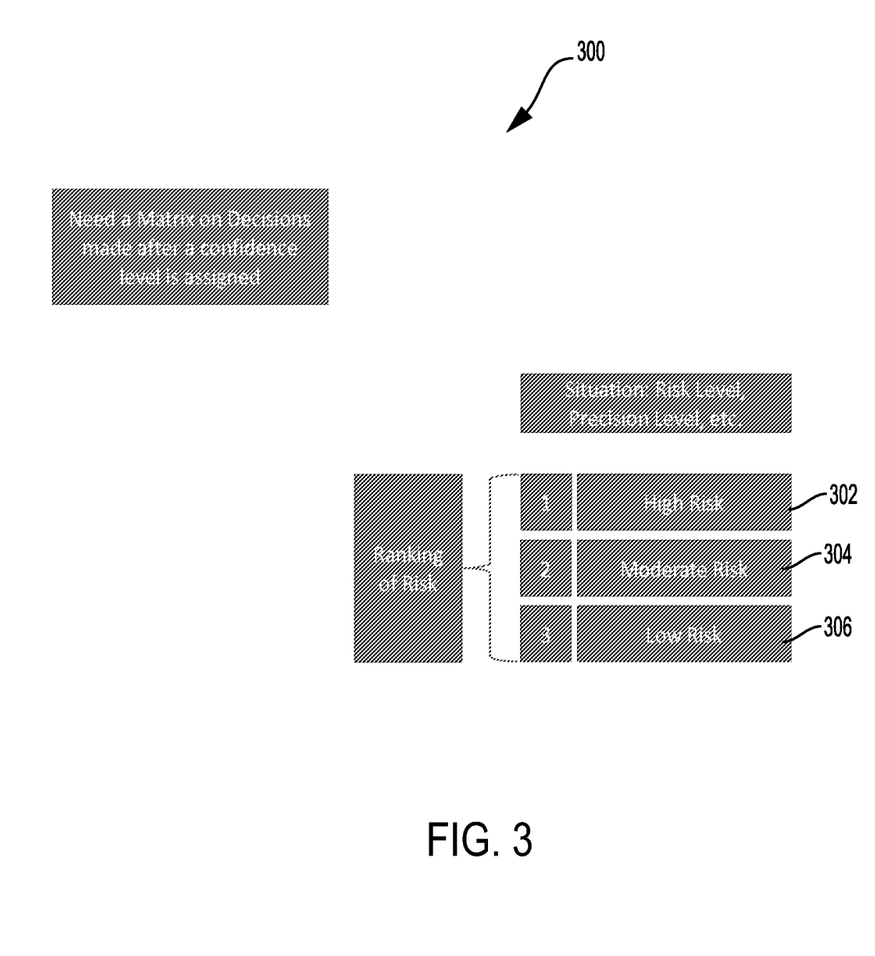
FIG. 3 a block diagram depicting an embodiment of confidence levels under risk requirement in accordance with the present disclosure.

FIG. 3 is a block diagram depicting an embodiment of confidence levels for risk requirement. In some situations, the level of confidence or precision required may be ranked based on risk levels. For example, when a drone attempts to fly through a narrow doorway or a tunnel. This task may be considered as a high risk task. In this case, a GPS input may not be precise enough for dimensions of the door or the tunnel, and thus GPS may be assigned a low confidence level. Whereas an altimeter input may provide precise information for flying through the door or the tunnel, and may be given a high confidence level.

As shown in the matrix 300, a risk level condition is applied when assigning a confidence level to a sensor input. Based on the risk level condition, a ranking of sensory inputs is provided. For example, a high risk level 302 may be assigned to a first input, which leads to a lower confidence level for the first input. A moderate risk level 304 may be assigned to a second input, which leads to a moderate confidence level for the second input. Similarly, a low risk level 306 may be assigned to a third input, which leads to a high confidence level for the third input.

Figure 4:
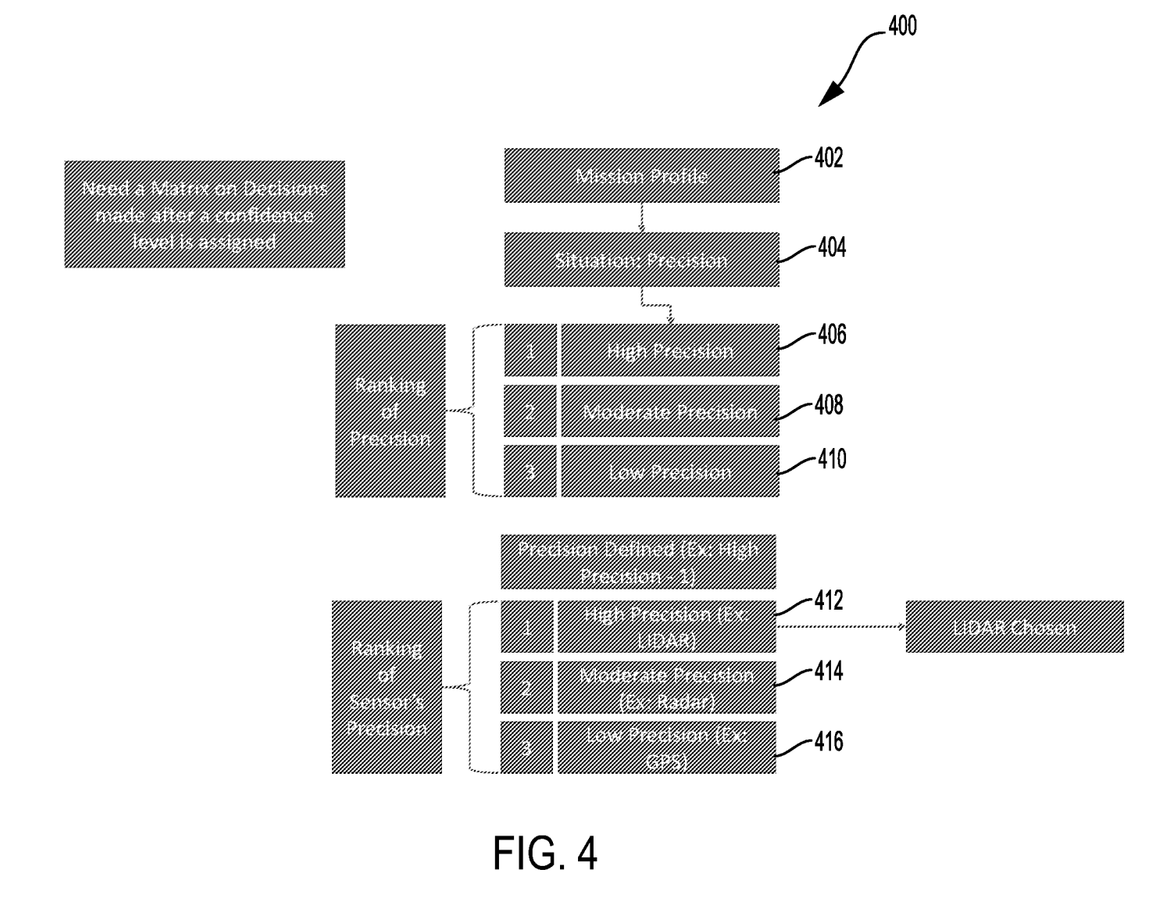
FIG. 4 a block diagram depicting an embodiment of confidence levels under precision requirement in accordance with the present disclosure.

FIG. 4 is a block diagram 400 depicting an embodiment of confidence levels for precision requirement. In some situations, inputs may be ranked based on precision levels. In the diagram 400, a mission profile 402 is analyzed and determined to require inputs with high precisions. For example, the mission may be to drop a package in a precise location, which require high precision inputs. The precision may be ranked as high precision 406, moderate precision 408, and low precision 410. When a precision level condition is applied when assigning a confidence level to a sensor input, based on the precision level condition, a ranking of sensory inputs is provided. For example, a high precision

412 may be assigned to a LIDAR input, which leads to a high confidence level. A moderate precision 414 may be assigned to a Radar input, which leads to a moderate confidence level for this input. Similarly, a low precision 416 may be assigned to a GPS input, which leads to a low confidence level for the GPS input. According to the mission profile, the LIDAR input may be chosen to make a decision. The diagram 400 may be stored in the control unit.

Figure 5:
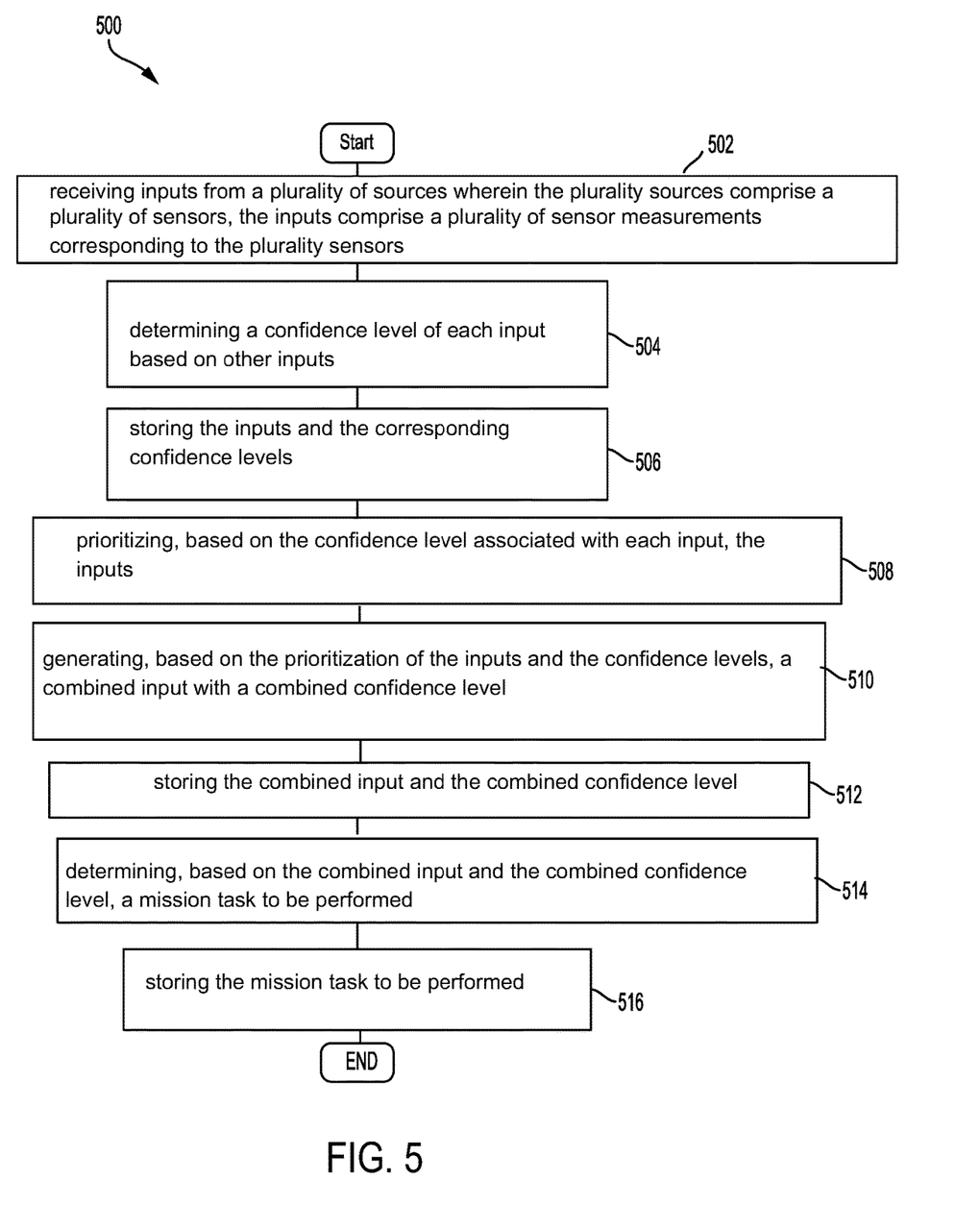
FIG. 5 illustrates a method that can be used for the system in FIG. 1 according to one embodiment.

FIG. 5 illustrates a method 500 that can be used with the system in FIG. 1 according to one embodiment. The method 500 may be implemented in the system 100 and may comprise the following steps.

At step 502 inputs from a plurality of sources are received. The plurality of sources may comprise a plurality of sensors. The inputs may comprise a plurality of sensor measurements corresponding to the plurality sensors. The inputs may further comprise logical information. The logical information may include image pre-processing, authentication mechanism authorization, and information from peer vehicles. The logical information may also include diagnostics or maintenance information of sensors, operational status, air traffic control conditions, and environmental factors. For example, if a sensor has not undergone maintenance for a long time or is damaged, or broken, then less confidence may be put in that sensor.

The plurality of sensors may be configured to generate the plurality of sensor measurements corresponding to the plurality of sensors. Each of the plurality of sensors may be specified with a sensor threshold. The sensor threshold may be a lower threshold, an upper threshold, or both thereof. For example, a speed sensor may be specified a speed measurement range, out of which the speed measurements are considered as inaccurate.

At step 504, a confidence level of each input is determined. The confidence level of an input may be evaluated in terms of the situation in which the input is generated, which device generates the input, whether the input is generated from a source with a trusted certificate, what task the vehicle is performing, and so forth. The above information for evaluating confidence level may be contained in a document stored in the control unit.

At step 506, the inputs and the corresponding confidence levels are stored, for example in a database. The database may be a database onboard the vehicle. The database may be a database remotely deployed, with which the vehicle can communicate. The inputs and the corresponding confidence levels may be stored in a block of a blockchain. The inputs and the corresponding confidence levels may also be stored in a memory of the control unit of the vehicle.

At step 508, the inputs are prioritized, for example, for all inputs or for inputs within a category, based on the confidence level associated with each input. The inputs may be ranked in an order from a lowest confidence level to a highest confidence level. For example, inputs related to an altitude measurement may be from a plurality of difference sources. The difference sources may include GPS, optical sensor, acoustic sensor, user input, peer vehicles, etc.

At step 510, a combined input with a combined confidence level may be generated, based on the prioritization of the inputs and the confidence levels. For example, a weighted average input may be generated from the inputs. In an example of the inputs related to flying speed, the inputs may be 90 miles per hour (MPH), 95 MPH, 85 MPH, 100 MPH, etc. An average of the inputs may be produced as the combined input. Accordingly, a combined confidence level may be generated from the confidence level associated with the inputs. The combined confidence level may be for inputs within a category or in different categories.

At step 512, the combined input and the combined confidence level are stored, for example in the database. As described above, the database may be located at any desired place. Also the combined input and the combined confidence level may be stored in a memory of the control unit of the vehicle, or in a block of the blockchain.

At step 514, a mission task to be performed may be generated based on the combined input and the combined confidence level. As described above, the mission task may be corrective actions, for example, forced landing, forced landing to a preferred or known safe location, emergency status beaconing, or a flight maneuver (such as stop, turn, yaw, bank, pitch, roll, hover, accelerate, decelerate.)

At step 516, the mission task to be performed may be stored, e.g., in the database. As described above, the database may be located at any desired place. Also the combined input and the combined confidence level may be stored in a memory of the control unit of the vehicle, or in a block of the blockchain. The vehicle may perform the task immediately, may wait for further instructions to perform the task, or may also cancel the task when detecting a change made to the situation.

Figure 6:
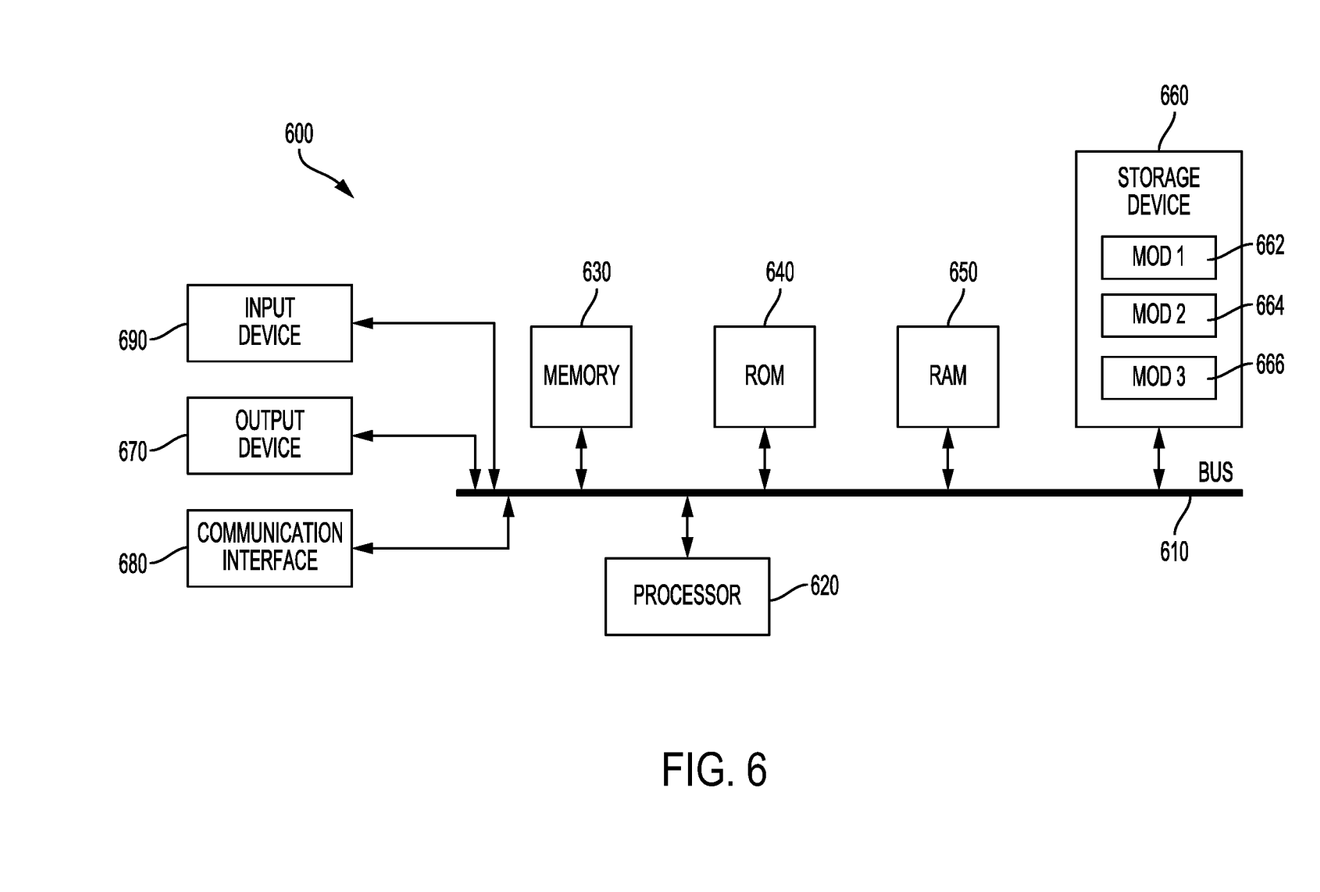
FIG. 6 illustrates an example computer system which can be used to implement the systems and methods to one example embodiment.

FIG. 6 illustrates an example computer system 600 which can be used to perform the systems for inventory monitoring as disclosed herein. The exemplary system 600 can include a processing unit (CPU or processor) 620 and a system bus 610 that couples various system components including the system memory 630 such as read only memory (ROM) 640 and random access memory (RAM) 650 to the processor 620. The system 600 can include a cache of high speed memory connected directly with, in close proximity to, or integrated as part of the processor 620. The system 600 copies data from the memory 630 and/or the storage device 660 to the cache for quick access by the processor 620. In this way, the cache provides a performance boost that avoids processor 620 delays while waiting for data. These and other modules can control or be configured to control the processor 620 to perform various actions. Other system memory 630 may be available for use as well. The memory 630 can include multiple different types of memory with different performance characteristics. It can be appreciated that the disclosure may operate on a computing device 600 with more than one processor 620 or on a group or cluster of computing devices networked together to provide greater processing capability. The processor 620 can include any general purpose processor and a hardware module or software module, such as module 1 662, module 2 664, and module 3 666 stored in storage device 660, configured to control the processor 620 as well as a special-purpose processor where software instructions are incorporated into the actual processor design. The processor 620 may essentially be a completely self-contained computing system, containing multiple cores or processors, a bus, memory controller, cache, etc. A multi-core processor may be symmetric or asymmetric.

The system bus 610 may be any of several types of bus structures including a memory bus or memory controller, a peripheral bus, and a local bus using any of a variety of bus architectures. A basic input/output (BIOS) stored in ROM 640 or the like, may provide the basic routine that helps to transfer information between elements within the computing device 600, such as during start-up. The computing device 600 further includes storage devices 660 such as a hard disk drive, a magnetic disk drive, an optical disk drive, tape drive or the like. The storage device 660 can include software modules 662, 664, 666 for controlling the processor 620. Other hardware or software modules are contemplated. The storage device 660 is connected to the system bus 610 by a drive interface. The drives and the associated computer-readable storage media provide nonvolatile storage of computer-readable instructions, data structures, program modules and other data for the computing device 600. In one aspect, a hardware module that performs a particular function includes the software component stored in a tangible computer-readable storage medium in connection with the necessary hardware components, such as the processor 620, bus 610, display 670, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 600 is a small, handheld computing device, a desktop computer, or a computer server.

Although the exemplary embodiment described herein employs the hard disk 660, other types of computer-readable media which can store data that are accessible by a computer, such as magnetic cassettes, flash memory cards, digital versatile disks, cartridges, random access memories (RAMs) 650, and read only memory (ROM) 640, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 600, an input device 690 represents any number of input mechanisms, such as a microphone for speech, a touch-sensitive screen for gesture or graphical input, keyboard, mouse, motion input, speech and so forth. An output device 670 can also be one or more of a number of output mechanisms known to those of skill in the art. In some instances, multimodal systems enable a user to provide multiple types of input to communicate with the computing device 600. The communications interface 680 generally governs and manages the user input and system output. There is no restriction on operating on any particular hardware arrangement and therefore the basic features here may easily be substituted for improved hardware or firmware arrangements as they are developed.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

What is claimed is:

1. An autonomous vehicle system for controlling an autonomous vehicle, comprising:
   a plurality of sensors configured to generate a plurality of sensor measurements corresponding to the plurality of sensors; and
   a control unit configured to:
      receive inputs from the plurality of sensors, wherein the inputs comprise the plurality of sensor measurements;
      receive logical information indicating situations in which the plurality of sensors are operating;
      determine a mission requirement associated with a mission task to be performed by the autonomous vehicle;
      for each respective sensor of the plurality of sensors,
         determine, based on the logical information, a risk level associated with a situation in which the respective sensor is operating,
         determine, based on the logical information, a precision level associated with the respective sensor,
         determine, based on the logical information, an operational condition associated with the situation in which the respective sensor is operating,
         select one of the risk level, the precision level or the operational condition as a ranking criterion for the plurality of sensors based on the mission requirement, and
         generate a confidence level of each input received from the respective sensor based on the ranking criterion;
      prioritize, based on the confidence level associated with each input, the inputs;
      generate, based on the prioritization of the inputs and respective confidence levels, a combined input; and
      control the autonomous vehicle to perform the mission task based on the combined input and the situations.

2. The system of claim 1, wherein the autonomous vehicle is an automatic guided vehicle or an unmanned aerial vehicle.

3. The system of claim 1, wherein the plurality of sensors include at least one of: a laser altimeter, a global positioning system (GPS), a light detection and ranging (LIDAR) system, a radio detecting and ranging (RADAR) system, a transponder, an optic sensor, or an automatic dependent surveillance broadcast (ADSB) sensor.

4. The system of claim 1, wherein the logical information is received from at least one of: a flight controller, a flight system, a real time kinematic (RTK) satellite navigation, unmanned traffic management (UTM), an air traffic controller (ATC), command and Control (C2), geofence, a weather monitor, aircraft capabilities and limitations, accelerometer, magnetometer, gyroscope, faulty equipment, waypoints and routes, delivery destinations, user inputs, Internet connectivity, satellite connectivity, invalidated communications, or communication with other autonomous vehicles.

5. The system of claim 1, wherein the inputs further comprise historical data stored in a database.

6. The system of claim 1, wherein the control unit is further configured to group, based on a measurement type, the inputs.

7. The system of claim 1, wherein the mission task to be performed comprises at least one of: forced landing of the autonomous vehicle, disabling one or more of the plurality of sensors, changing a route of the autonomous vehicle, beaconing an emergency status, or performing a desired flight maneuver of the autonomous vehicle.

8. The system of claim 1, wherein the control unit is further configured to:
   identify a primary input received from a primary sensor of the plurality of sensors; and
   replace, based on the situation in which the primary sensor is operating, the primary input with a secondary input received from another autonomous vehicle.

9. The system of claim 8, wherein:
   the primary input is replaced with the secondary input based on confidence levels of the primary input and the secondary input.

10. The system of claim 1, wherein:
the control unit is further configured to validate each input by checking for a trusted certificate associated with the input; and
the trusted certificate is received from at least one of: a flight controller, a flight system, a laser altimeter, GPS, differential GPS, RTK, optic sensors, LIDAR, RADAR, ADSB sensors and transponders, unmanned traffic management (UTM), air traffic controller (ATC), command and control (C2), geofence, weather monitor, or aircraft capabilities and limitations.

11. The system of claim 1, wherein the confidence level comprises a binary code that includes a matrix of binary code entries.

12. A method for controlling an autonomous vehicle, comprising:
receiving inputs from a plurality of sensors, wherein the inputs comprise a plurality of sensor measurements;
receiving logical information indicating situations in which the plurality of sensors are operating;
determining a mission requirement associated with a mission task to be performed by the autonomous vehicle;
for each respective sensor of the plurality of sensors,
determining, based on the logical information, a risk level associated with a situation in which the respective sensor is operating,
determining, based on the logical information, a precision level associated with the respective sensor,
determining, based on the logical information, an operational condition associated with the situation in which the respective sensor is operating,
selecting one of the risk level, the precision level or the operational condition as a ranking criterion for the plurality of sensors based on the mission requirement, and
generating a confidence level of each input received from the respective sensor based on the ranking criterion;
prioritizing, based on the confidence level associated with each input, the inputs;
generating, based on the prioritization of the inputs and respective confidence levels, a combined input; and
controlling the autonomous vehicle to perform the mission task based on the combined input and the situations.

13. The method of claim 12, wherein the mission task to be performed comprises at least one of: forced landing of the autonomous vehicle, disabling one or more of the plurality of sensors, changing a route of the autonomous vehicle, beaconing an emergency status, or performing a desired flight maneuver of the autonomous vehicle.

14. The method of claim 12, further comprising:
identifying a primary input received from a primary sensor of the plurality of sensors; and
replacing, based on the situation in which the primary sensor is operating, the primary input with a secondary input received from another autonomous vehicle.

15. The method of claim 14, wherein:
the primary input is replaced with the secondary input based on confidence levels of the primary input and the secondary input.

16. The method of claim 12, further comprising validating each input by checking for a trusted certificate associated with the input,
wherein the trusted certificate is received from at least one of: a flight controller, a flight system, a laser altimeter, GPS, differential GPS, RTK, optic sensors, LIDAR, RADAR, ADSB sensors and transponders, unmanned traffic management (UTM), air traffic controller (ATC), command and control (C2), geofence, weather monitor, or aircraft capabilities and limitations.

17. An apparatus for controlling an autonomous vehicle, comprising:
a non-transitory memory having instructions stored thereon; and
a processor configured to read the instructions to:
receive inputs from a plurality of sensors, wherein the inputs comprise a plurality of sensor measurements;
receive logical information indicating situations in which the plurality of sensors are operating;
determine a mission requirement associated with a mission task to be performed by the autonomous vehicle;
for each respective sensor of the plurality of sensors,
determine, based on the logical information, a risk level associated with a situation in which the respective sensor is operating,
determine, based on the logical information, a precision level associated with the respective sensor,
determine, based on the logical information, an operational condition associated with the situation in which the respective sensor is operating,
select one of the risk level, the precision level or the operational condition as a ranking criterion for the plurality of sensors based on the mission requirement, and
generate a confidence level of each input received from the respective sensor based on the ranking criterion;
prioritize, based on the confidence level associated with each input, the inputs;
generate, based on the prioritization of the inputs and respective confidence levels, a combined input; and
control the autonomous vehicle to perform the mission task based on the combined input and the situations.

18. The apparatus of claim 17, wherein the mission task to be performed comprises at least one of: forced landing of the autonomous vehicle, disabling one or more of the plurality of sensors, changing a route of the autonomous vehicle, beaconing an emergency status, or performing a desired flight maneuver of the autonomous vehicle.

19. The apparatus of claim 17, wherein the processor is further configured to read the instructions to:
identify a primary input received from a primary sensor of the plurality of sensors; and
replace, based on the situation in which the primary sensor is operating, the primary input with a secondary input received from another autonomous vehicle.

20. The apparatus of claim 19, wherein:
the primary input is replaced with the secondary input based on confidence levels of the primary input and the secondary input.

* * * * *